United States Patent
Hammes et al.

(10) Patent No.: US 12,007,495 B2
(45) Date of Patent: Jun. 11, 2024

(54) SAFETY SYSTEM AND METHOD OF LOCALIZATION

(71) Applicant: SICK AG, Waldkirch (DE)

(72) Inventors: Markus Hammes, Waldkirch (DE); Patrik Feth, Waldkirch (DE); Magnus Albert, Waldkirch (DE); Andreas Sixt, Waldkirch (DE); Tobias Hofmann, Waldkirch (DE); Eduard Mosgalewsky, Waldkirch (DE); Dominic Ruh, Waldkirch (DE); Matthias Neudorf, Waldkirch (DE); Lasse Dau, Waldkirch (DE); Jan Schlemmer, Waldkirch (DE); Mathias Ams, Waldkirch (DE); Hagen Feth, Waldkirch (DE)

(73) Assignee: SICK AG, Waldkirch (DE)

( * ) Notice: Subject to any disclaimer, the term of this patent is extended or adjusted under 35 U.S.C. 154(b) by 352 days.

(21) Appl. No.: 17/527,360

(22) Filed: Nov. 16, 2021

(65) Prior Publication Data

US 2022/0187413 A1    Jun. 16, 2022

(30) Foreign Application Priority Data

Dec. 16, 2020  (DE) .......................... 102020133788.4

(51) Int. Cl.
  *G01S 5/02* (2010.01)
  *G01C 21/20* (2006.01)
  *G01S 3/46* (2006.01)

(52) U.S. Cl.
  CPC ........ *G01S 5/02213* (2020.05); *G01C 21/206* (2013.01); *G01S 3/46* (2013.01); *G01S 5/0226* (2013.01)

(58) Field of Classification Search
  CPC ...... G01S 5/02213; G01S 3/46; G01S 5/0226; G01C 21/206
  See application file for complete search history.

(56) References Cited

U.S. PATENT DOCUMENTS

2003/0028323 A1   2/2003  Zeitler et al.
2010/0001896 A1*  1/2010  Fiereizen .................. G01S 3/48
                                                              342/394

FOREIGN PATENT DOCUMENTS

DE   102013001987 A1   8/2014
DE   102016217532 A1   3/2018
EP        1820611 A1   8/2007

OTHER PUBLICATIONS

German Office Action dated 20201-08-10 corresponding to application No. 10 2020 133 788.4.

* cited by examiner

*Primary Examiner* — Curtis B Odom
(74) *Attorney, Agent, or Firm* — Nath, Goldberg & Meyer; Jerald L. Meyer

(57) ABSTRACT

A method and a safety system for localizing at least two objects has a control and evaluation unit, and at least one radio location system. The radio location system has at least three arranged radio stations, wherein at least two respective radio transponders are arranged at the objects. The two radio transponders are arranged spaced apart from one another. Position data of the radio transponders and thus position data of the objects can be determined by means of the radio location system, and the position data can be transmitted from the radio station of the radio location system to the control and evaluation unit and/or the position data can be transmitted from the radio transponder to the control and evaluation unit. The control and evaluation unit is configured to cyclically detect and compare the position data of the radio transponders.

18 Claims, 6 Drawing Sheets

SAFETY SYSTEM AND METHOD OF LOCALIZATION

FIELD

The present invention relates to a safety system in accordance with the preamble of claim 1 and to a method in accordance with the preamble of claim 18.

BACKGROUND

It is the current practice in industrial safety engineering to manage hazards locally at the hazard location in that an approach or a presence of a person is detected and a machine or travel movement is stopped or the movement is slowed down in a safety relevant manner.

The prior art only describes local safety concepts.

It is an object of the invention to provide a safety system that does not only provide a local securing option.

SUMMARY

The object is satisfied in accordance with claim 1 by a safety system for localizing at least two objects having a control and evaluation unit, having at least one radio location system, wherein the radio location system has at least three arranged radio stations, wherein at least two respective radio transponders are arranged at the objects, wherein the two radio transponders are arranged spaced apart from one another, wherein position data of the radio transponders and thus positions data of the objects can be determined by means of the radio location system, wherein the position data can be transmitted from the radio station of the radio location system to the control and evaluation unit and/or the position data can be transmitted from the radio transponder to the control and evaluation unit, wherein the control and evaluation unit is configured to cyclically detect the position data of the radio transponders, and wherein the control and evaluation unit is configured to cyclically compare the position data of the radio transponders and to form cyclically checked position data of the objects.

The object is further satisfied in accordance with claim 18 by a method of localizing at least two objects having a control and evaluation unit, having at least one radio location system, wherein the radio location system hast at least three arranged radio stations, wherein at least two respective radio transponders are arranged at the objects, wherein the two radio transponders are arranged spaced apart from one another, wherein position data of the radio transponders and thus positions data of the objects are determined by means of the radio location system, wherein the position data are transmitted from the radio station of the radio location system to the control and evaluation unit and/or the position data are transmitted from the radio transponder to the control and evaluation unit, wherein the control and evaluation unit cyclically detects the position data of the radio transponders, and wherein the control and evaluation unit cyclically compares the position data of the radio transponders and forms cyclically checked position data of the objects.

In accordance with the invention, a securing is possible over larger zones, that is, for example, of a large number of work stations, of a large number of robots, or, for example, even of whole production facilities, since not only a local presence or approach of persons is detected, but rather a position of a large number of persons and mobile machines active in an environment or zone can be detected and can be continuously tracked.

This has the advantage that impending hazards can be discovered very much earlier since the control and evaluation unit or the safety system is simultaneously aware of the positions of a large number of objects and likewise knows their cyclic time progression. Measures to reduce risk that intervene a great deal less invasively in the automation routines and that interfere less with the productivity can thereby be carried out by the safety system.

The invention provides position data that can be used in a technical safety manner. This means that the position data of all persons and hazard sites thus acquired can be used as the basis for a comprehensive, forward-looking, and productivity optimizing securing concept.

The position tracking takes place by means of radio location. The objects are provided with radio transponders via which a localization signal is regularly transmitted to the fixed position radio stations and a position or real time position of the respective object is generated or formed in the control and evaluation unit or in a central control.

In accordance with the invention, the position information of a large number or of all of the mobile objects or mobile participants in an industrial work environment are available in real time.

Since at least two respective radio transponders are arranged at the respective object, errors in the localization information can be managed since namely the localization information from at least two independent radio transponders is always available. The localization and the formed position signal is thus usable in the sense of functional safety. It is thus possible to discover and avoid erroneous localizations and to improve the quality of the spatial information.

A safety situation can be evaluated by the control and evaluation unit on the basis of a plurality or of a large number of checked position data or pieces of position information. This zone orientated or space oriented securing thereby provides the possibility of further risk reduction measures.

The present invention thus also makes it possible in the event of error prone radio location information to make a check in the operating environment that it can be used in a technical safety manner in the sense of machine safety. It is discovered in this process when localization errors occur outside a specified tolerance range, for example due to shutting down, reflection, or radio signals being too weak. Defective localization information is corrected where possible in this process and is made usable for further use. If this is not possible, an error control measure is initiated; the position value is flagged as erroneous, for example.

The localization information, position information, or position data present are thus checked with respect to their reliability. A degree of reliability required for the further use can furthermore be associated with the position data.

The previously customary strategy in accordance with the prior art, according to which a machine is shut down or slowed down on the presence of a person in a hazard zone, can admittedly also be provided in accordance with the invention, but it is also possible to avoid a shutting down or a direct slowing down with the present invention since more information on the total situation and positions of the objects is present.

The localization of the radio transponders takes place by time of flight measurements or time of arrival measurements of radio signals that are cyclically exchanged between the radio transponders and a plurality of fixed position radio stations. This triangulation or multilateration works very well when the signals are transmitted at a sufficient signal strength and on a straight or direct propagation path. Since this does not always have to be the case, a cross-comparison is now made between the position information of the radio transponders determined in this manner.

A redundant position determination with at least two radio transponders is provided for technical safety reasons. Since the radio transponders are small and relatively inexpensive, this error control measure is simple to implement and is very effective with respect to the error control.

The positions of both radio transponders of an object are generally determined and compared with one another in principle. A series of critical error cases can be controlled by the comparison of the positions of the radio transponders and in particular by the comparison with a known expectation, namely the spacing of the radio transponders in an expected zone.

An error according to which a radio transponder no longer delivers any position information is discovered and controlled. An error according to which the signals of the radio transponders are poor and are subject to a large systematic error is discovered and controlled. An error according to which a synchronization of the radio transponders is no longer possible is discovered and controlled.

In the sense of the invention, the positions are therefore determined by means of radio location for at least two radio transponders in a spaced apart arrangement and are compared with the expectation of a known spaced apart arrangement.

In accordance with a first alternative of the invention, the signals of a radio transponder are received by a plurality of fixed position radio stations or anchor stations and the basis for the localization is created via a time of flight measurement, e.g. the time of arrival (TOA) or e.g. the time difference of arrival (TDOA). The calculation or estimation of the position of a radio transponder then takes place on the control and evaluation unit, for example an RTLS (real time location system) server, that is connected to all the radio stations or anchor stations via a wireless or wired data link. This mode of localization is called an RTLS (real time location system) mode.

Alternatively, the position information can, however, also be determined on each radio transponder. In this case, the safety system works in a comparable manner to the GPS navigation system. Each radio transponder receives the signals of the radio stations or anchor stations that are transmitted in a fixed time relationship with one another. A position estimate of the radio transponder can also be carried out here via the different time of flight measurements and the knowledge of the radio station positions or anchor positions. The radio transponder itself calculates its position and can transmit it to the RTLS server as required with the aid of the radio signal or of other wireless data links.

The position determination in the GPS mode is independent of the position determination in the RTLS mode in different respects:
  The calculation does not, for example, take place on a central server, but locally on a radio transponder.
  The basis for the position calculation is formed by the determined times of flight of the signals of the fixed position radio stations. Unlike this, the signals of the radio transponders serve for the time of flight calculation in the RTLS mode.
  The decision on which subset of the radio station signals present are used for the position calculation is made by the radio transponder on the basis of the determined signal quality and the relative radio station positions. A subset of the transmission signals present is thus used.
  Conversely, in the RTLS mode, use is made of a subset of the signals received at the different radio stations.

This independence of the position determination can now be used to check the localization. If both modes are operated in parallel., i.e. position data are determined both in the RTLS mode and in the GPS mode, a diverse and redundant comparison can then take place for verification in this manner. The requirement is the merging of both pieces of position information in the control and evaluation unit.

In a further development of the invention, plausibility values are formed on the basis of the detected signal strengths of the radio signals of the radio transponders and from the comparison of the position data of the radio transponders.

A degree of plausibility that enters into the further use of the position data or of the position information is derived as a result of the consistency check. A position value that is confirmed by different independent sources with a small relativity error is given a very high plausibility value in this process. If, in contrast, there are large deviations of the independent measurements from one another or if measurement values are missing or implausible, a low plausibility value is associated with these measurements.

A check is made in this process whether the measured positions coincide within the framework of a specified tolerance with a known configuration or whether there are significant deviations. A plausibility code of the radio location is set for this measurement cycle in dependence on the degree of coincidence. A high plausibility value therefore means a good coincidence between expectation and measurement, while a small plausibility value signals a defective measurement. This plausibility number can be used for the further processing in a safety related function as "safety-related confidence information" in accordance with IEC62998-1.

In a further development of the invention, the object is a movable object, a mobile machine, or a person.

The movable object, a movable machine or mobile machine can, for example, be a guideless vehicle, a driverless vehicle or autonomous vehicle, an automated guided vehicle (AGV), an autonomous mobile robot (AMR), an industrial mobile robot (IMR), or a robot having movable robot arms. The mobile machine thus has a drive and can be moved in different directions.

The person can, for example, be an operator or a service engineer. The radio transponders are arranged at the clothing or on the equipment of the person, for example. It can here, for example, be a vest to which the radio transponders are firmly fixed. The radio transponders are arranged, for example, on the shoulders and in the chest or back areas. The radio transponders can, however, also be arranged at different locations on the person. Two radio transponders are, for example, arranged on the shoulders of a vest of a person.

In a further development of the invention, the spacings between the radio transponders are known to the control and evaluation unit and are stored in a memory of the control and evaluation unit.

It is thereby possible to teach and store different objects having individual spacings of the radio transponders so that the safety system can identify stored objects and can distinguish them from non-stored objects.

In a further development of the invention, the spacings between the radio transponders vary on a person due to the person's movements or are variable due to a movement of the person.

The spacing of at least two radio transponders thereby varies cyclically as soon as the person moves, whereby the position detection of the radio transponders is dynamized and thereby becomes testable, whereby errors in the position detection and in the detection of the orientation are avoided. The spacing of two radio transponders that are each arranged on the shoulders of a person varies slightly, for example, when the person is walking since the position of the shoulder blades varies slightly.

The spacings of the radio transponders are thus variable, with the variable spacing also being known here. The spacing can, for example, be measured here, in particular cyclically measured.

In a further development of the invention, at least three radio transponders are arranged, with the control and evaluation unit being configured to form orientation data of the object from the position data of the radio transponders.

Two radio transponders are, for example, arranged on the shoulders of a vest of a person. A further transponder is, for example, arranged on a helmet of the person.

An overdetermined system is thereby advantageously present in a technical safety manner. Even if a radio transponder were to fail or if its radio signals were not detectable, two radio transponders would still remain that can be evaluated redundantly. A highly available safety system is thereby present.

In a further development of the invention, at least four, at least six, or at least eight radio transponders are arranged at the object, with two respective radio transponders each lying on a straight line, with the straight lines each being perpendicular to one another.

Radio transponders are thereby respectively arranged in pairs, with the respective pairs each having a different orientation. An orientation determination from every direction is thereby unambiguous. Furthermore, a radio transponder can also be arranged at the point of intersection of the straight lines so that a single radio transponder forms a center or a central position point that can be used as a reference position.

In a further development of the invention, the control and evaluation unit is configured to respectively determine a position of the radio transponders at different points in time and to determine a speed, an acceleration, a direction of movement, and/or a path or trajectory of the radio transponders from it.

A comparison takes place, for example, with the predictions of a trajectory estimate while taking account of known properties of the mobile participant or of the object.

An expectation of the position measurement or of the position data is also again compared with the determined measurement value or the determined position data here. The movement of persons is namely subject to limits with regard to acceleration and speed. There is also the expectation of the direction of movement with mobile objects or vehicles. These expectations can make predictions on future positions in the form of movement estimators such as Kalman filters and these estimates are then used for the plausibilization of the real measurement values or position data.

A route of an object, of a mobile machine, or of a vehicle can thereby be tracked, for example, and an action can, for example, be triggered in dependence on the movement direction or on the movement speed. The object can, for example, be positioned with targeted precision.

In a further development of the invention, the radio transponders each have at least one time measurement unit, with the radio stations likewise respectively having at least one time measuring unit, with the radio stations being configured to read and describe the times of the time measurement units of the radio transponders and with the radio stations being configured to synchronize the times of the time measurement units of the radio transponders and with the radio stations being configured to compare the times of the rime measurement units of the radio transponders with the times of the time measurement units of the radio stations.

A more precise position determination is thereby possible that can also be carried out permanently precisely by the synchronization, in particular with moving objects.

In a further development of the invention, the safety system has optical sensors for the localization and detection of the objects.

The position data or the position information can be compared with safe or unsafe position data or position information that were/was detected at spots at specific locations in the operating environment with the aid of optical sensors.

An example is the comparison with the position data that were determined in the field of vision of an optical sensor, for example a 3D camera. It can be in an intersection zone, for example. The position relative to the 3D camera is determined in this process on the detection of an object in the field of vision and the global position of the object is derived using the known position of the 3D camera. In this respect, both statically attached optical sensors and mobile optical sensors whose position and orientation are known through other sources are provided. A test is subsequently made as to whether an object that matches this position value is in a list of the objects tracked by means of radio location. On sufficient agreement, the position value of the radio location is deemed checked. In this case, a diverse redundant approach has confirmed the measurement.

The optical position data typically have a better accuracy and can additionally be used to improve the position accuracy of the person or of the mobile machine.

The plausibility of a position value is therefore the greater, the better the agreement between the optical position determination and the radio location and the less ambiguously the association between the optical position determination and the radio location is also possible. In the above-shown case, the additional difficulty can, for example, be present that it is not possible to reliably determine whether a first radio location does not possibly also belong to a second optical localization and vice versa. Such ambiguities are considered in the plausibility. This consideration can also take place in that the association is carried out in a safety relevant manner such that a minimal deviation between the radio location and the optical position results. It can alternatively also take place in that preceding position values are tracked and the association is made such that the interval from the preceding measurement is minimized.

In a further development of the invention, the safety system has radar sensors for the localization and detection of the objects.

The position data or the position information can be compared with safe or unsafe position data or position information that were/was detected at spots at specific locations in the operating environment with the aid of radar sensors.

An example is the comparison with the position data that were determined in the field of vision of a radar sensor, for example an area radar sensor. It can be in an intersection zone, for example. The position relative to the radar sensor is determined in this process on the detection of an object in the field of vision and the global position of the object is derived using the known position of the radar sensor. In this respect, both statically attached radar sensors and mobile radar sensors whose position and orientation are known through other sources are provided. A check is subsequently made as to whether an object that matches this position value or these position data is in a list of the objects tracked by means of radio location. On sufficient agreement, the position value of the radio location is deemed checked. In this case, a diverse redundant approach has confirmed the measurement.

The position data of the radar sensors typically have a higher range and can additionally be used to improve the position accuracy of the person or of the mobile machine.

The plausibility of a position value is therefore the greater, the better the agreement between the optical position determination and the radio location and the less ambiguous the association between the radar position determination and the radio location is also possible. In the above-shown case, the additional difficulty can, for example, be present that it is not possible to reliably determine whether a first radio location does not possibly also belong to a second radar localization and vice versa. Such ambiguities are considered in the plausibility. This consideration can also take place in that the association is carried out in a safety relevant manner such that a minimal deviation between the radio location and the radar localization results. It can alternatively also take place in that preceding position values are tracked and the association is made such that the interval from the preceding measurement is minimized.

In a further development of the invention, the safety system has RFID sensors for the localization and detection of the objects.

The position data can be compared with safe or unsafe position data or position information that were/was detected at spots at specific locations in the operating environment with the aid of RFID sensors.

An example is the comparison with the position data that were determined in the fields of vision of RFID sensors. It can be in an intersection zone, for example. The position relative to the RFID sensors is determined in this process on the detection of an object in the field of vision and the global position of the object is derived using the known position of the RFID sensor. In this respect, both statically attached RFID sensors and mobile RFID sensors whose position and orientation are known through other sources are provided. A check is subsequently made as to whether an object that matches this position value is in a list of the objects tracked by means of radio location. On sufficient agreement, the position value of the radio location is deemed checked. In this case, a diverse redundant approach has confirmed the measurement.

The position data of the RFID sensors typically have a similar accuracy and can additionally be used to improve the position accuracy of the person or of the mobile machine.

The plausibility of a position value is therefore the greater, the better the agreement between the optical position determination and the radio location and the less ambiguously the association between the RFID sensor determination and the radio location is also possible. In the above-shown case, the additional difficulty can, for example, be present that it is not possible to reliably determine whether a first radio location does not possibly also belong to a second localization by means of RFID sensors and vice versa. Such ambiguities are considered in the plausibility. This consideration can also take place in that the association is carried out in a safety relevant manner such that a minimal deviation between the radio location and the RFID sensor position results. It can alternatively also take place in that preceding position values are tracked and the association is made such that the interval from the preceding measurement is minimized.

In a further development of the invention, the safety system has ultrasound sensors for the localization and detection of the objects.

The position data can be compared with safe or unsafe position data or position information that were/was detected at spots at specific locations in the operating environment with the aid of ultrasound sensors.

An example is the comparison with the position data that were determined in the field of vision of an ultrasound sensor, for example an ultrasound area sensor. It can be in an intersection zone, for example. The position relative to the ultrasound sensor is determined in this process on the detection of an object in the field of vision and the global position of the object is derived using the known position of the ultrasound sensor. In this respect, both statically attached ultrasound sensors and mobile ultrasound sensors whose position and orientation are known through other sources are provided. A check is subsequently made as to whether an object that matches this position value is in a list of the objects tracked by means of radio location. On sufficient agreement, the position value of the radio location is deemed checked. In this case, a diverse redundant approach has confirmed the measurement.

The ultrasound sensors typically have a similar accuracy and can additionally be used to improve the position accuracy of the person or of the mobile machine.

The plausibility of a position value is therefore the greater, the better the agreement between the ultrasound sensor position determination and the radio location and the less ambiguously the association between the ultrasound position determination and the radio location is also possible. In the above-shown case, the additional difficulty can, for example, be present that it is not possible to reliably determine whether a first radio location does not possibly also belong to a second ultrasound localization and vice versa. Such ambiguities are considered in the plausibility. This consideration can also take place in that the association is carried out in a safety relevant manner such that a minimal deviation between the radio location and the optical position results. It can alternatively also take place in that preceding position values are tracked and the association is made such that the interval from the preceding measurement is minimized.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

A plurality of radio stations, for example more than three, are preferably arranged that monitor at least some of the movement zone of the person or of the object.

In a further development of the invention, a change of the safety function of the safety system takes place on the basis of the checked position data by means of the control and evaluation unit.

If a predetermined position has been recognized that is stored, for example, the control and evaluation unit can switch over to a different protective measure or safety function. The switching over of the protective measure can comprise, for example, a switching over of measurement data contours, a switching over of protected fields, a parameter or shape matching of measurement data contours or protected fields, and/or a switching over of the properties of a protected field. The properties of a protected field include, for example, the resolution and/or the response time. A switching over of the protective measure can also be a safety function such as a force restriction of the drive to which the switchover is made.

In a further development of the invention, position data checked by means of the control and evaluation unit are checked for agreement with stored position data of a safe point of interest.

A check of the radio location can additionally optionally be carried out at specific monitoring points that, for example, deliver both optically determined position information and position information detected by radio location in the sense that a check is made as to whether a radio location has taken place at all for a detected object. Such a confirmation can reveal the safety critical error cases of a missing or non-functioning tag and can satisfy the demands on a cyclic check in the sense of the standard ISO 13849-1.

The comparison with independent position data can also take place at known interaction points. For example, on actuation of a switch or on a monitored passage through a door. At this moment, the position of the operator is very precisely known and can be used for a validation of the position data or of the position information. A corresponding process is also possible with autonomous vehicles. The position is very accurately known on docking at a charge station or on an arrival at transfer stations and can be used for checking the radio location and technical safety error control.

In a further development of the invention, the safety system, for example, has a map or a map model and a navigation of the movable machine takes place in the map or map model.

In this respect, the comparison with accessible routes in the floor plan can also serve for the check. For this purpose that region is marked as part of the configuration of the localization system in which mobile machines and persons can dwell at all, in particular walkable or travelable routes. A localization that is outside these zones will thus signal a systematic measurement error. The degree of plausibility is reduced by the determined inconsistency.

These configured zones can likewise be used to improve the position accuracy in that the position information is corrected such that it is within an accessible zone. This correction can optionally take place using past localizations and trajectory estimates, e.g. with the aid of a Kalman filter. A correction will reduce the degree of plausibility of a piece of position information since the correction introduces an additional unsafety factor.

Additional information can also be made usable here by considering preceding values. The correction of inconsistent position values can therefore take place in the direction of the last valid measurement or in accordance with a trajectory estimate.

A comparison of radio locations that were determined with the aid of independent or different subsets of the available radio stations or anchor points is furthermore possible The method makes use of the fact that as a rule all of the radio stations or anchor points are not required for the determination of the position and thus a plausibilization is possible from the measurement data themselves in that the same localization work is carried out by two different subgroups of the stationary radio stations. A cross-comparison with the expectation of the agreement is checked here as with the comparison of independent measurements of different radio transponders.

The invention will also be explained in the following with respect to further advantages and features with reference to the enclosed drawing and to embodiments. The Figures of the drawing show in:

BRIEF DESCRIPTION OF THE DRAWINGS

In the following Figures, identical parts are provided with identical reference numerals.

DETAILED DESCRIPTION

Figure 1:
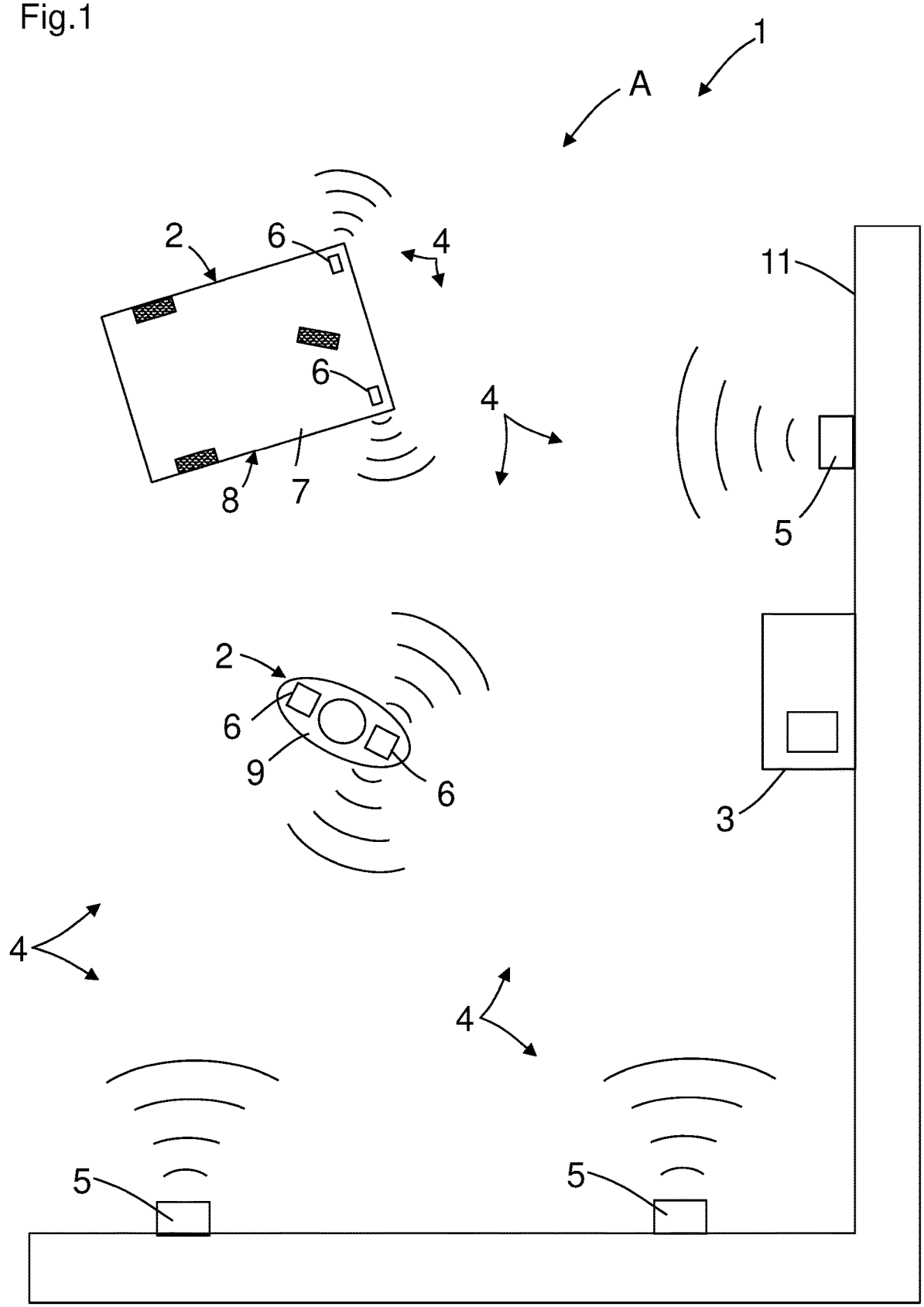
FIGS. 1 to 3 and in each case a safety system for the localization of FIGS. 7 and 8 at least two objects.

FIG. 1 shows a safety system 1 for localizing at least two objects 2 having a control and evaluation unit 3, having at least one radio location system 4, wherein the radio location system 4 has at least three arranged radio stations 5, wherein at least two respective radio transponders 6 are arranged at the objects 2, wherein the two radio transponders 6 are arranged spaced apart from one another, wherein position data of the radio transponders 6 and thus position data of the objects 2 can be determined by means of the radio location system 4, wherein the position data can be transmitted from the radio station 5 of the radio location system 4 to the control and evaluation unit 3 and/or the position data can be transmitted from the radio transponder 6 to the control and evaluation unit 3, wherein the control and evaluation unit 3 is configured to cyclically detect the position data of the radio transponders 6, and wherein the control and evaluation unit 3 is configured to cyclically compare the position data of the radio transponders 6 and to form cyclically checked position data of the objects 2. A zone A is bounded in accordance with FIG. 1 by boundaries or walls 11.

Figure 2:
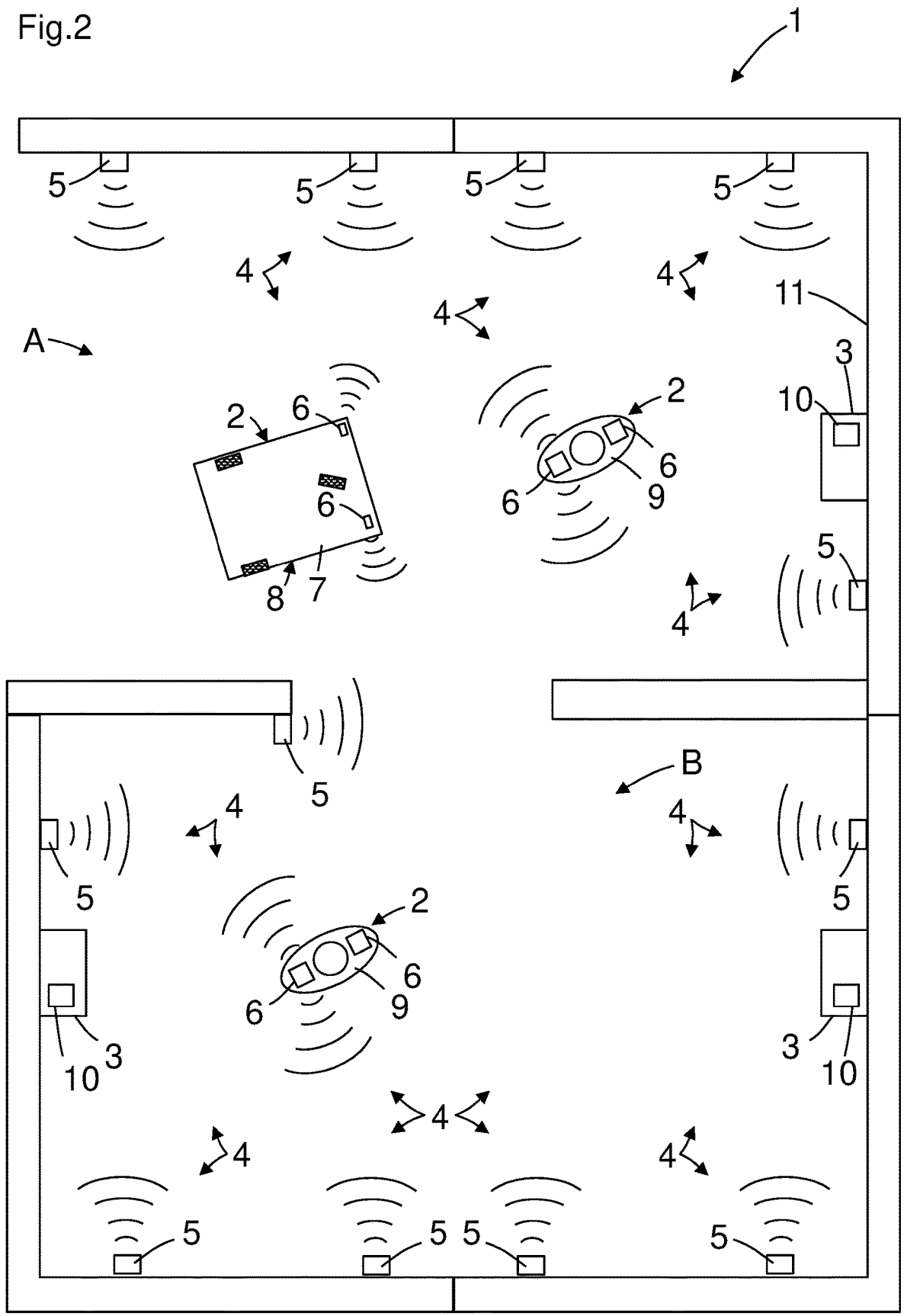

FIG. 2 shows two zones A and B that are connected to one another via a passage and that are connected to one another by means of boundaries or walls 11.

In accordance with FIG. 2, a securing is possible over larger zones A and B, that is, for example, of a large number of work stations, of a large number of robots, or, for example, of whole production facilities, since not only a local presence or approach of persons 9 is detected, but rather a position of a large number of persons 9 and mobile machines 8 active in an environment or zone A, B can be detected and can be continuously tracked. A plurality of radio stations are provided for this purpose, for example.

Possible hazards can be discovered very much earlier since the control and evaluation unit 3 or a plurality of connected control and evaluation units 3 or the safety system 1 is/are simultaneously aware of the positions of a large number of objects 2 and likewise knows their cyclic temporal progression. Measures to reduce risk that intervene a great deal less invasively in the automation routines and that interfere less with the productivity can thereby be carried out by the safety system.

In accordance with FIG. 2, position data usable in a technical safety manner are provided in a large zone A, B. This means that the position data of all persons 9 and hazard sites thus acquired can be used as the basis for a comprehensive, forward-looking, and productivity optimizing securing concept.

The position tracking takes place by means of radio location. The objects are provided with radio transponders 6 via which a localization signal is regularly transmitted to the fixed position radio stations 5 and a position or real time position of the respective object 2 is generated or formed in the control and evaluation unit 3 or in a central control.

In accordance with FIG. 2, the position information of a large number or of all of the mobile objects 2 or mobile participants or mobile machines 8 are available in real time in an industrial work environment.

Since at least two respective radio transponders 6 are arranged at the respective object 2, errors in the localization information can be avoided since namely the localization information from at least two independent radio transponders 6 is always available.

A safety situation can be evaluated by the control and evaluation unit 3 on the basis of a plurality or of a large number of checked position data or pieces of position information. This zone orientated or space oriented securing thereby provides the possibility of further risk reduction measures.

The localization of the radio transponders 6 takes place by time of flight measurements of radio signals that are cyclically exchanged between the radio transponders 6 and a plurality of fixed position radio stations 5. This triangulation works very well when the signals are transmitted at a sufficient signal strength and on a straight or direct propagation path. Since this does not always have to be the case, a cross-comparison is now made between the position information of the radio transponders 6 determined in this manner.

A redundant position determination with at least two radio transponders 6 is provided for technical safety reasons.

The positions of both radio transponders 6 of an object 2 are generally determined and compared with one another in principle. Critical errors can be controlled by the comparison of the positions of the radio transponders 6 and in particular by the comparison with a known expectation namely the spacing of the radio transponders 6 in an expected zone.

In accordance with FIG. 2, the positions are therefore determined by means of radio location for at least two radio transponders 6 in a spaced apart arrangement at an object and are compared with the expectation of a known spaced apart arrangement.

In accordance with a first alternative, the signals of a radio transponder 6 are received by a plurality of fixed position radio stations 5 or anchor stations and the basis for the localization is created via a time of flight measurement, e.g. the time of arrival (TOA) or e.g. the time difference of arrival (TDOA). The calculation or estimation of the position of a radio transponder 6 then takes place on the control and evaluation unit 3, for example an RTLS (real time location system) server that is connected to all the radio stations 5 or anchor stations via a wireless or wired data link. This mode of localization is called an RTLS (real time location system) mode.

Alternatively, the position information can, however, also be determined on each radio transponder 6. In this case, the safety system 1 works in a comparable manner to the GPS navigation system. Each radio transponder 6 receives the signals of the radio stations 5 or anchor stations that are transmitted in a fixed time relationship with one another. A position estimate of the radio transponders 6 can also be carried out here via the different time of flight measurements and the knowledge of the radio station positions or anchor positions. The radio transponder 6 itself calculates its position and can transmit it to the control and evaluation unit 3 or to the RTLS server as required with the aid of the radio signal or of other wireless data links.

The position determination in the GPS mode is independent of the position determination in the RTLS mode. This independence of the position determination can now be used to check the localization. If both modes are operated in parallel., i.e. position data are determined both in the RTLS mode and in the GPS model, a diverse and redundant comparison can then take place for verification in this manner. The requirement is the merging of both pieces of position information on the control and evaluation unit 3.

Plausibility values are formed on the basis of the detected signal strengths of the radio signals of the radio transponders 6 and from the comparison of the position data of the radio transponders 6.

A degree of plausibility that enters into the further use of the position data or of the position information is derived as a result of the consistency check. A position value that is confirmed by different independent sources with a small relativity error is given a very high plausibility value in this process. If, in contrast, there are large deviations of the independent measurements from one another or if measurement values are missing or implausible, a low plausibility value is associated with these measurements.

A check is made in this process whether the measured positions coincide within the framework of a specified tolerance with a known configuration or whether there are significant deviations. A plausibility tag of the radio location for this measurement cycle is set in dependence on the degree of coincidence. A high plausibility value therefore means a good coincidence between expectation and measurement, while a small plausibility value signals a defective measurement.

In accordance with FIG. 2, the object 2 is a movable object, a mobile machine 8, or a person 9.

The movable object, a movable machine, or an autonomous vehicle, or mobile machine 8 can, for example, be a guideless vehicle, a driverless vehicle, an automated guided vehicle (AGV), an autonomous mobile robot (AMR), an industrial mobile robot (IMR), or a robot having movable robot arms. The mobile machine 8 thus has a drive and can be moved in different directions.

The person 9 can, for example, be an operator or a service engineer. The radio transponders 6 are arranged on the clothing or on the equipment of the person 9, for example. It can here, for example, be a vest to which the radio transponders 6 are firmly fixed. The radio transponders 6 are arranged, for example, on the shoulders and in the chest and back areas. The radio transponders 6 can, however, also be arranged at different locations on the person 0. Two radio transponders 6 are, for example, arranged on the shoulders of a vest of a person 9.

In accordance with FIG. 2, the spacings between the radio transponders are known to the control and evaluation unit 3 and are stored in a memory 10 of the control and evaluation unit 3.

It is thereby possible to teach and store different objects 2 having individual spacings of the radio transponders 6 so that the safety system 1 can identify stored objects 2 and can distinguish them from non-stored objects 2.

In accordance with FIG. 2, the spacings between the radio transponders 6 vary on a person 9 due to the person's movements or are variable due to a movement of the person 9.

The spacing of at least two radio transponders 6 thereby vary as soon as the person moves, whereby the position detection of the radio transponders 6 is dynamized and thereby becomes testable, whereby errors in the position detection and in the detection of the orientation are avoided. The spacing of two radio transponders that are each arranged on the shoulders of a person 9 varies slightly, for example, when the person 9 is walking since the position of the shoulder blades varies slightly.

The distances of the radio transponders 6 are thus variable, with the variable spacing also being known here. The spacing can, for example, be measured here, in particular cyclically measured.

Figure 3:
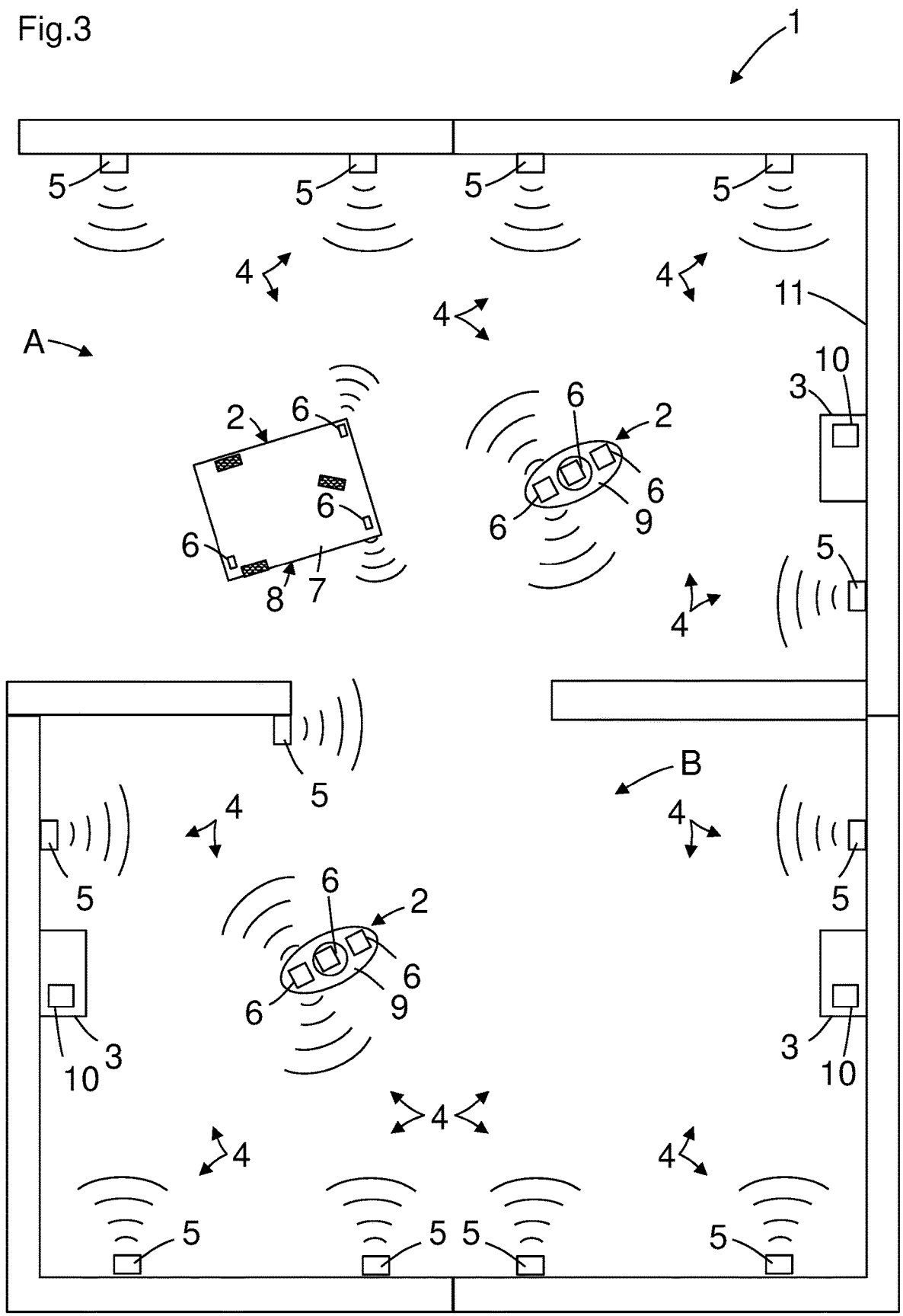

In accordance with FIG. 3, at least three radio transponders 6 are arranged, with the control and evaluation unit 3 being configured to form orientation data of the object 2 from the position data of the radio transponders 6.

Two radio transponders 6 are, for example, arranged on the shoulders of a vest of a person 9. A further radio transponder 6 is, for example, arranged on a helmet of the person 9.

An overdetermined system is thereby advantageously present in a technical safety manner. Even if a radio transponder 6 were to fail or if its radio signals were not detectable, two radio transponders 6 would still remain that can be evaluated redundantly.

Figure 4:
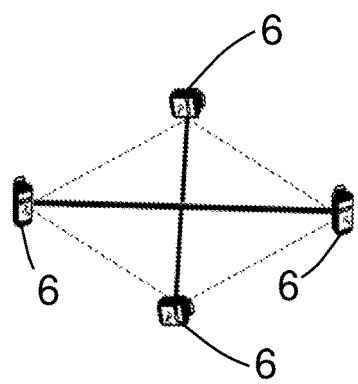
FIGS. 4 to 6 in each case a plurality of radio transponders at an object.
Figure 5:
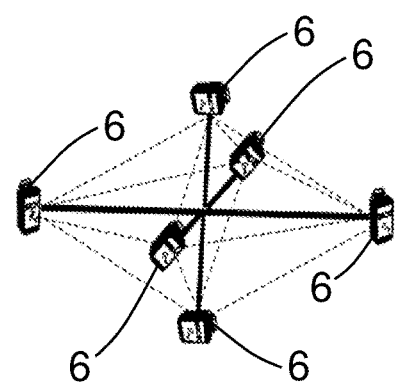
Figure 6:
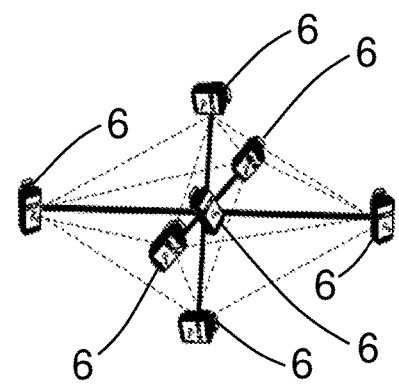

In accordance with FIG. 4 at least four, in accordance with FIG. 5 at least six, or in accordance with FIG. 6 at least eight radio transponders 6 are arranged at an object 2, with two respective radio transponders 6 each lying on a straight line, with the straight lines each being perpendicular to one another.

Radio transponders 6 are thereby respectively arranged in pairs, with the respective pairs each having a different orientation. An orientation determination from every direction is thereby unique. Furthermore, a radio transponder 6 can also be arranged at the point of intersection of the straight lines so that a single radio transponder 6 forms a center or a central position point that can be used as a reference position.

Figure 7:
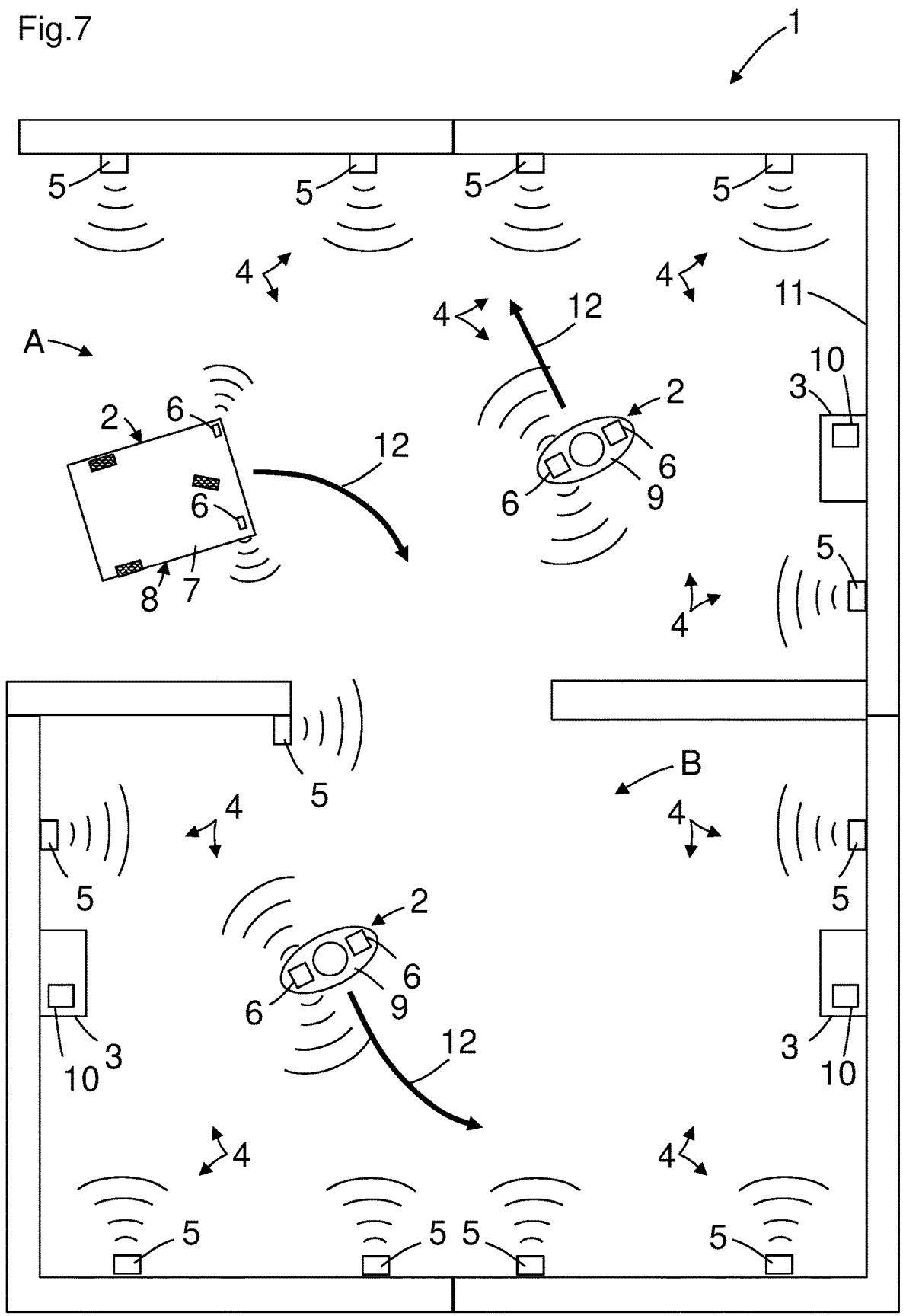

In accordance with FIG. 7, the control and evaluation unit 3 is configured to respectively determine a position of the radio transponders 6 at different points in time and to determine a speed, an acceleration, a direction of movement and/or a path 12 or trajectory 12 of the radio transponders 6 from it.

A comparison takes place, for example, with the predictions of a trajectory estimate while taking account of known properties of the mobile participant or of the object 2.

An expectation of the position measurement or of the position data is also again compared with the determined measurement value or the determined position data here. The movement of persons 9 is namely subject to limits with regard to acceleration and speed. There is also the expectation of the direction of movement with mobile objects 2 or vehicles. These expectations can make predictions on future positions in the form of movement estimators such as Kalman filters and these estimates are then used for the plausibilization of the real measurement values or position data.

A route of an object 2, of a mobile machine 8, or of a vehicle can thereby be tracked, for example, and an action can, for example, be triggered in dependence on the movement direction or on the movement speed. The object 2 can, for example, be positioned with targeted precision.

For example, the radio transponders 6 each have at least one time measurement unit, with the radio stations 5 likewise respectively having at least one time measurement unit, with the radio stations 5 being configured to read and describe the times of the time measurement units of the radio transponders 6 and with the radio stations 5 being configured to synchronize the times of the time measurement units of the radio transponders 6 and with the radio stations 5 being configured to compare the times of the time measurement units of the radio transponders 6 with the times of the time measurement units of the radio stations 5.

A more precise position determination is thereby possible that can also be carried out permanently precisely by the synchronization, in particular with moving objects 2.

Figure 8:
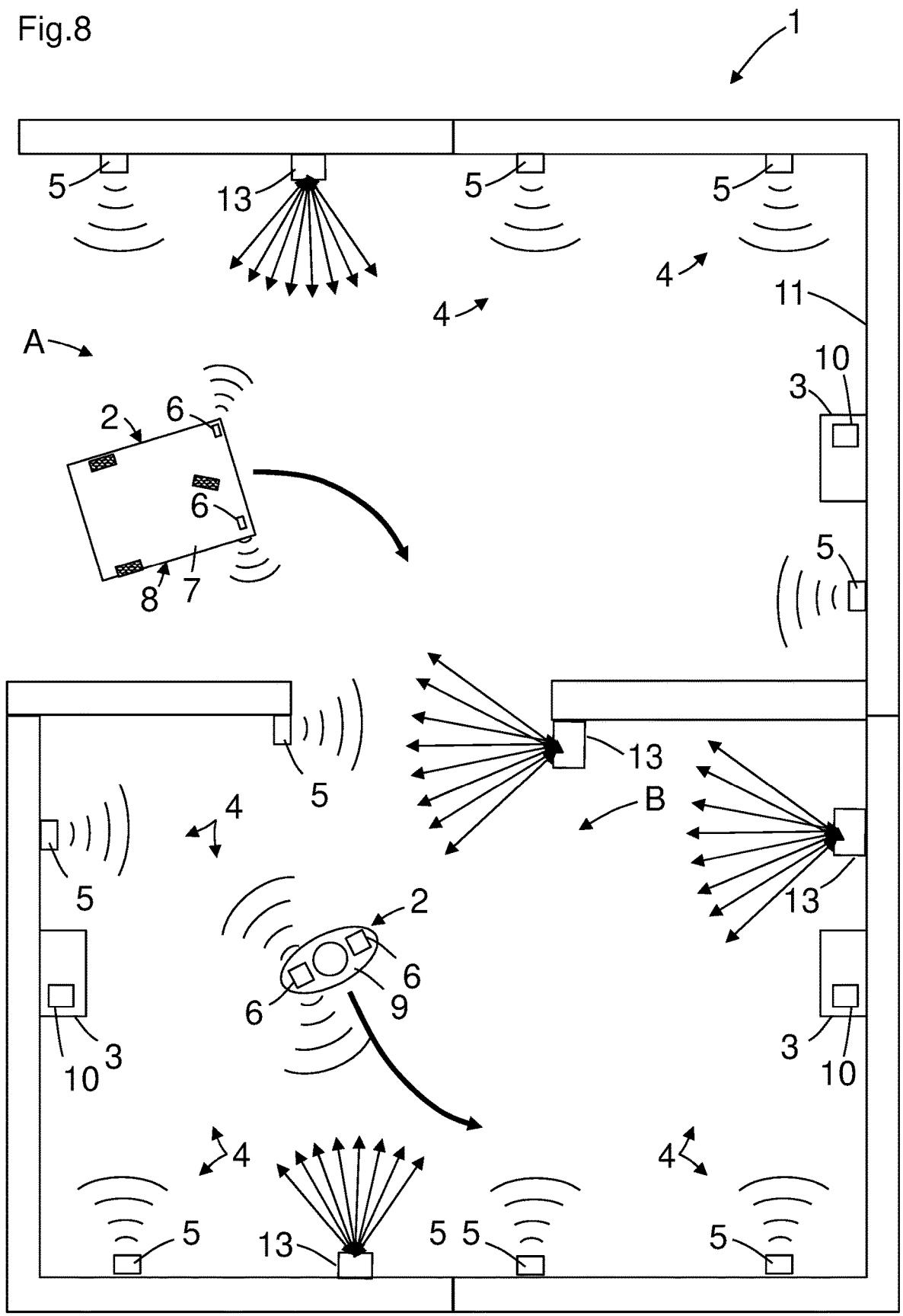

In accordance with FIG. 8, the safety system 1 has additional sensors of a different sensor technology. Additional optical sensors 13 are, for example, provided for the localization and detection of the objects 2. The additional sensors can, however, also be radar sensors, RFID sensors, ultrasound sensors, and/or other suitable sensors.

The optical sensors 13 can, for example, be laser scanners, light grids, light curtains, light barriers, optical distance sensors, or similar.

The radio location system 4, for example, is an ultra wideband radio location system, with the frequency used being in the range from 3.1 GHz to 10.6 GHz, with the transmission energy per radio station amounting to a maximum of 0.5 mW per radio station.

A plurality of radio stations 5, for example more than three, are arranged in accordance with FIG. 8 that monitor at least some of the movement zone of the person 9 or object 2.

In accordance with FIG. 8, a change of the safety function of the safety system 1 takes place on the basis, for example, of the checked position data by means of the control and evaluation unit 3. The mobile machine 8 can, for example, travel at a higher seed in zone A than in zone B in which a person 9 moves, since a risk to the person 9 has to be avoided in zone B. The change from zone A into zone B of the vehicle can be determined, for example, by means of the radio stations 5 in the proximity of the passage between zone A and zone B.

If a predetermined position has been recognized that is stored, for example, the control and evaluation unit 3 can switch over to a different protective measure or safety function; for example to a change of the speed of a mobile machine 8 or of a mobile autonomous vehicle. The switching over of the protective measure can comprise, for example, a switching over of measurement data contours, a switching over of protected fields, a parameter or shape matching of measurement data contours or protected fields, and/or a switching over of the properties of a protected field. The properties of a protected field include, for example, the resolution and/or the response time. A switching over of the protective measure can also be a safety function such as a force restriction of the drive to which the switchover is made.

For example, position data checked by means of the control and evaluation unit 3 are checked for agreement with stored position data of a safe point of interest.

A check of the radio location can additionally optionally be carried out at specific monitoring points, for example at the passage in FIG. 8, that, for example, deliver both optically determined position information and position information detected by radio location in the sense that a check is made as to whether a radio location has taken place at all for a detected object 2. Such a confirmation can reveal the safety critical error cases of a missing or non-functioning tag and can satisfy the demands on a cyclic check in the sense of the standard ISO 13849-1.

The comparison with independent position data can also take place at known interaction points. For example, by actuation of a switch or on a monitored passage through a door. At this moment, the position of the operator is very precisely known and can be used for a validation of the position data or of the position information. A corresponding process is also possible with autonomous vehicles. The position is very accurately known on docking at a charge station or on an arrival at transfer stations and can be used for checking the radio location and technical safety error control.

For example, the safety system 1 has a map or a map model and a navigation of the movable machine takes place in the map or map model.

In this respect, the comparison with accessible routes in the floor plan can also serve for the check. For this purpose that region is marked as part of the configuration of the localization system in which mobile machines and persons 9 can dwell at all, in particular walkable or travelable routes. A localization that is outside these zones will thus signal a systematic measurement error. The degree of plausibility is reduced by the determined inconsistency.

These configured zones can likewise be used to improve the position accuracy in that the position information is corrected such that it is within an accessible zone. This correction can optionally take place using past localizations and trajectory estimates, e.g. with the aid of a Kalman filter. A correction will reduce the degree of plausibility of a piece of position information since the correction introduces an additional unsafety factor.

Additional information can also be made usable here by considering preceding values. The correction of inconsistent position values can therefore take place in the direction of the last valid measurement or in accordance with a trajectory estimate.

A comparison of radio locations that were determined with the aid of independent or different subsets of the available radio stations 5 or anchor points is furthermore possible The method makes use of the fact that as a rule all of the radio stations 5 or anchor points are not required for the determination of the position and thus a plausibilization is possible from the measurement data themselves in that the same localization work is carried out by two different subgroups of the stationary radio stations 5. A cross-comparison with the expectation of the agreement is checked here as with the comparison of independent measurements of different radio transponders 6.

REFERENCE NUMERALS

1 safety system
2 object
3 control and evaluation unit
4 radio location system
5 radio stations
6 radio transponder
7 movable object
8 movable machine
9 person
10 memory
11 wall/boundary
12 path/trajectory
13 optical sensor
A zone
B zone

The invention claimed is:

1. A safety system (1) for localizing at least two objects (2) comprising:
at least one control and evaluation unit (3), having at least one radio location system (4), wherein
the radio location system (4) has at least three arranged radio stations (5);
wherein at least two respective radio transponders (6) are arranged at the objects (2), with the two radio transponders (6) being arranged spaced apart from one another;
wherein position data of the radio transponders and thus position data of the objects (2) can be determined by means of the radio location system (4);
wherein the position data can be transmitted from the radio station (5) of the radio location system (4) to the control and evaluation unit (3);
and/or wherein the position data can be transmitted from the radio transponder (6) to the control and evaluation unit,
characterized in that
the control and evaluation unit (3) is configured to cyclically detect the position data of the radio transponders, with the control and evaluation unit (3) being configured to cyclically compare the position data of the radio transponders (6) and to form cyclically checked position data of the objects (2).

2. A safety system (1) in accordance with claim 1, characterized in that plausibility values are formed on the basis of detected signal strengths of radio signals of the radio transponders and from the comparison of the position data of the radio transponders.

3. A safety system (1) in accordance with claim 1, characterized in that the object (2) is a movable object (7), a mobile machine (8) or a person (9).

4. A safety system (1) in accordance with claim 1, characterized in that the spacings between the radio transponders (6) are known to the control and evaluation unit (3) and are stored in a memory of the control and evaluation unit.

5. A safety system (1) in accordance with claim 1, characterized in that the spacings between the radio transponders (6) vary or are variable in a person due to the movement of the person.

6. A safety system (1) in accordance with claim 1, characterized in that at least three radio transponders are arranged, with the control and evaluation unit (3) being configured to form orientation data of the object (2) from the position data of the radio transponders (6).

7. A safety system (1) in accordance with claim 1, characterized in that at least four, at least six, or at least eight radio transponders (6) are arranged at the object (2), with two respective transponders (6) being disposed on a respective straight line, with the straight lines each being perpendicular to one another.

8. A safety system (1) in accordance with claim 1, characterized in that the control and evaluation unit (3) is configured to respectively determine a position of the radio transponders (6) at different points in time and to determine a speed, an acceleration, a direction of movement and/or a path (trajectory) of the radio transponders (6) from it.

9. A safety system (1) in accordance with claim 1, characterized in that the radio transponders (6) each have at least one time measurement unit, with the radio stations (5) likewise respectively having at least one time measurement unit, with the radio stations (5) being configured to read and describe the times of the time measurement units of the radio transponders (6) and with the radio stations (5) being configured to synchronize the times of the time measurement units of the radio transponders (6) and with the radio stations (5) being configured to compare the times of the time measurement units of the radio transponders (6) with the times of the time measurement units of the radio stations (5).

10. A safety system (1) in accordance with claim 1, characterized in that the safety system has optical sensors for localizing and detecting the objects.

11. A safety system (1) in accordance with claim 1, characterized in that the safety system has radar sensors for localizing and detecting the objects.

12. A safety system (1) in accordance with claim 1, characterized in that the safety system has RFID sensors for localizing and detecting the objects.

13. A safety system (1) in accordance with claim 1, characterized in that the safety system has ultrasound sensors for localizing and detecting the objects.

14. A safety system (1) in accordance with claim 1, characterized in that the radio location system (4) is an ultra wideband radio location system, with the frequency used being in the range from 3.1 GHz to 10.6 GHz, with a transmission energy per radio station (5) amounting to a maximum of 0.5 mW.

15. A safety system (1) in accordance with claim 1, characterized in that a change of a safety function of the safety system (1) takes place by means of the control and evaluation unit (3) based on the cyclically checked position data.

16. A safety system (1) in accordance with claim 1, characterized in that position data checked by means of the control and evaluation unit controller (3) are checked for agreement with stored position data of a safe point of interest.

17. A safety system (1) in accordance with claim 1, characterized in that the safety system (1) has a map or a map model; and in that a navigation of a movable machine takes place in the map or in the map model.

18. A method of localizing at least two objects (2) having a control and evaluation unit (3), having at least one radio location system (4),
    wherein the radio location system (4) has at least three arranged radio stations (5),
    wherein at least two respective radio transponders (6) are arranged at the objects (2), with the two radio transponders (6) being arranged spaced apart from one another,
    the method comprising:
    determining, by means of the radio location system (4), position data of the radio transponders and thus position data of the objects (2);
    wherein the position data are transmitted from the radio station (5) of the radio location system (4) to the control and evaluation unit (3),
    and/or wherein the position data are transmitted from the radio transponder (6) to the control and evaluation unit,
    characterized in that
    the control and evaluation unit (3) cyclically detects the position data of the radio transponders,
    with the control and evaluation unit (3) cyclically comparing the position data of the radio transponders (6) and forming cyclically checked position data of the objects (2).

* * * * *